(12) United States Patent
Sun et al.

(10) Patent No.: US 12,137,440 B2
(45) Date of Patent: Nov. 5, 2024

(54) BEAM SWEEPING WITH SLOT AGGREGATION

(71) Applicant: Apple Inc., Cupertino, CA (US)

(72) Inventors: Yakun Sun, San Jose, CA (US); Anatoliy S. Ioffe, Sunnyvale, CA (US); Ehsan Haghani, Redwood City, CA (US); Rohit U. Nabar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 17/939,742

(22) Filed: Sep. 7, 2022

(65) Prior Publication Data

US 2023/0007653 A1 Jan. 5, 2023

Related U.S. Application Data

(63) Continuation of application No. 16/671,865, filed on Nov. 1, 2019, now Pat. No. 11,751,176.

(60) Provisional application No. 62/755,219, filed on Nov. 2, 2018.

(51) Int. Cl.
| | |
|---|---|
| *H04W 72/0446* | (2023.01) |
| *H04B 7/06* | (2006.01) |
| *H04L 1/16* | (2023.01) |
| *H04W 24/10* | (2009.01) |
| *H04W 72/23* | (2023.01) |
| *H04W 72/542* | (2023.01) |

(52) U.S. Cl.
CPC ...... *H04W 72/0446* (2013.01); *H04B 7/0617* (2013.01); *H04L 1/16* (2013.01); *H04W 72/23* (2023.01); *H04W 72/542* (2023.01); *H04W 24/10* (2013.01)

(58) Field of Classification Search
CPC ..... H04W 72/0446; H04B 7/0617; H04L 1/16
See application file for complete search history.

(56) References Cited

U.S. PATENT DOCUMENTS

| | | |
|---|---|---|
| 2017/0163325 A1 | 6/2017 | Kang et al. |
| 2019/0141693 A1 | 5/2019 | Guo et al. |
| 2019/0342921 A1 | 11/2019 | Loehr et al. |
| 2020/0053767 A1 | 2/2020 | Bai et al. |
| 2020/0059821 A1 | 2/2020 | Wirth et al. |
| 2020/0107327 A1 | 4/2020 | Wang et al. |
| 2021/0127324 A1 | 4/2021 | Agiwal et al. |
| 2022/0006595 A1* | 1/2022 | Blankenship ......... H04W 72/23 |

* cited by examiner

*Primary Examiner* — Won Tae C Kim
(74) *Attorney, Agent, or Firm* — FLETCHER YODER PC

(57) ABSTRACT

Methods and systems include beamformed wireless communications to and from a user equipment electronic device. During operation of the user equipment electronic device, a change in slot aggregation is made. Using the aggregated slots, the user equipment electronic device and/or a wireless network utilize beam sweeps to determine a best beam pairing by repeating a shared channel in the aggregated slots with a beam sweep of multiple beams between the user equipment electronic device and the wireless network.

20 Claims, 7 Drawing Sheets

BEAM SWEEPING WITH SLOT AGGREGATION

CROSS-REFERENCE TO RELATED APPLICATIONS

This application claims priority to U.S. application Ser. No. 16/671,865, filed Nov. 1, 2019, and entitled "BEAM SWEEPING WITH SLOT AGGREGATION,", which claims priority to U.S. Provisional Application No. 62/755,219, filed Nov. 2, 2018, and entitled "BEAM SWEEPING WITH SLOT AGGREGATION," each of which is incorporated herein by reference in its entirety for all purposes.

BACKGROUND

The present disclosure relates generally to beam sweeping with slot aggregation for user equipment (UE).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The $3^{rd}$ Generation Partnership Project (3GPP) defines various standards as part of the duties of the collaborative organization. For example, 3GPP has defined a 5G New Radio (NR) Frequency Range 2 (FR2) specification telling the UE and a Next Generation NodeB (gNB) how to communicate using 5G communications. The 3GPP NR FR2 specifies that the UE using beamforming. A 3GPP NR FR2 link is in centimeter or millimeter wave band and relies on beamforming for connections. In beamforming, reference signals (RS) are transmitted to obtain and track beams as network overhead. The RS may include a synchronization signal block (SSB) or channel site information reference signal (CSIRS) in a downlink. In an uplink, the RS may include a sounding reference signal (SRS).

The 3GPP NR FR2 specification also supports robustness and reliability improvement by allowing downlink and uplink slot aggregation. Specifically, when an aggregationFactorDL is configured to be greater than 1, the UE will expect that a physical downlink shared channel (PDSCH) is repeated over multiple consecutive slots. Similarly, when an aggregationFactorUL is configured as greater than 1, the UE will repeat a physical uplink shared channel (PUSCH) over multiple consecutive slots. Both PDSCH and PUSCH may be used in slot aggregation scheduled by a downlink control information (DCI) with only one beam indicated for the aggregated slots.

A FR2 UE may be in a "local" high mobility state having constant/repeated rotation and/or small movements of the UE. A "strongest" beam may change and may be re-selected through beam measurement and reporting. In certain deployments where the UE is in a frequently changing environment (crowds, moving vehicles, and the like), the beams may be blocked and unblocked in a frequently changing manner where beam tracking/update may be performed using beam measurement and reporting. However, in these high-mobility scenarios, the use of frequent beam training and reports may lead to an impermissible amount of network overhead. Furthermore, even with frequent beam management, there may be a delay from an actual change of which beam is the strongest beam to an update of beam usage by the UE. This delay may occur due to transmission from a transmission reception point (TRP) in a downlink or a UE panel in an uplink may only use one beam in a slot resulting in a high latency and a quality of signal (QoS) degradation when transmitting to multiple directions. In addition, panel selection also uses measurement and report, adding to the latency and network overhead.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

To improve coverage of the network, multiple TRPs may be deployed in the network, and multiple antenna panels/modules may be equipped in the UE. With multiple TRPs in the network and/or multiple antenna panels in UE, PDSCH and PUSCH can be transmitted/received from different directions. As discussed below, extending multi-slot PDSCH/PUSCH with beam sweeping can be a solution to the high mobility challenge. When downlink or uplink slot aggregation is configured, the PDSCH/PUSCH may be repeated in multiple time slots while beam sweeping. Using multiple beams from multiple panels increases the chance that beam points to the gNB, avoiding the increased latency in updating beams/panels and/or the requirement of beam alignment.

Figure 1:
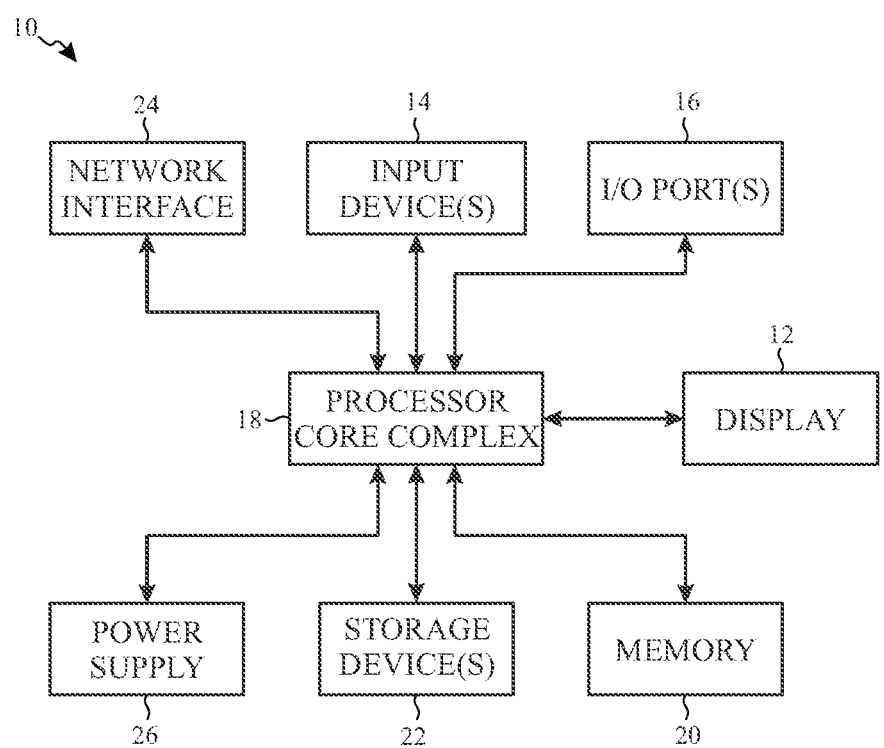
FIG. 1 is a block diagram of an electronic device used to communicate with a base node, in accordance with an embodiment of the present disclosure.

As will be described in more detail below, the electronic device 10 may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 25. The various components described in FIG. 1 may include hardware elements (e.g., circuitry), software elements (e.g., a tangible, non-transitory computer-readable medium storing instructions), or a combination of both hardware and software elements. It should be noted that, in some embodiments, the various depicted components may be combined into fewer components or separated into additional components. For example, the local memory 20 and the main memory storage device 22 may be included in a single component.

As depicted, the processor core complex 18 is operably coupled to the local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof. Furthermore, as previously noted, the processor core complex 18 may include one or more separate processing logical cores that each process data according to executable instructions.

In addition to the executable instructions, the local memory 20 and/or the main memory storage device 22 may store the data to be processed by the cores of the processor core complex 18. Thus, in some embodiments, the local memory 20 and/or the main memory storage device 22 may include one or more tangible, non-transitory, computer-readable media. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled to the network interface 24. In some embodiments, the network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In some embodiments, the network interface 24 includes one or more antennas configured to communicate over network (s) connected to the electronic device 10.

Additionally, as depicted, the processor core complex 18 is operably coupled to the power source 25. In some embodiments, the power source 25 may provide electrical power to one or more component in the electronic device 10, such as the processor core complex 18, the electronic display 12, and/or the network interface 24. Thus, the power source 25 may include any suitable source of energy, such as a rechargeable lithium polymer (Li-poly) battery and/or an alternating current (AC) power converter.

Furthermore, as depicted, the processor core complex 18 is operably coupled to the I/O ports 16. In some embodiments, the I/O ports 16 may enable the electronic device 10 to receive input data and/or output data using port connections. For example, a portable storage device may be connected to an I/O port 16 (e.g., universal serial bus (USB)), thereby enabling the processor core complex 18 to communicate data with the portable storage device. In some embodiments, the I/O ports 16 may include one or more speakers that output audio from the electronic device 10.

As depicted, the electronic device 10 is also operably coupled to input devices 14. In some embodiments, the input device 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. For instance, the captured audio may be used to create voice memorandums. In some embodiments, voice memorandums may include a single-track audio recording.

Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. For example, the electronic display 12 may be used to display a voice memorandum application interface for a voice memorandum application that may be executed on the electronic device 10. In some embodiments, the electronic display 12 may be a display using liquid crystal display (LCD), a self-emissive display, such as an organic light-emitting diode (OLED) display, or the like.

As depicted, the electronic display 12 is operably coupled to the processor core complex 18. In this manner, the electronic display 12 may display image frames based at least in part on image data generated by the processor core complex 18. Additionally or alternatively, the electronic display 12 may display image frames based at least in part on image data received via the network interface 24 and/or the I/O ports 16.

Figure 2:
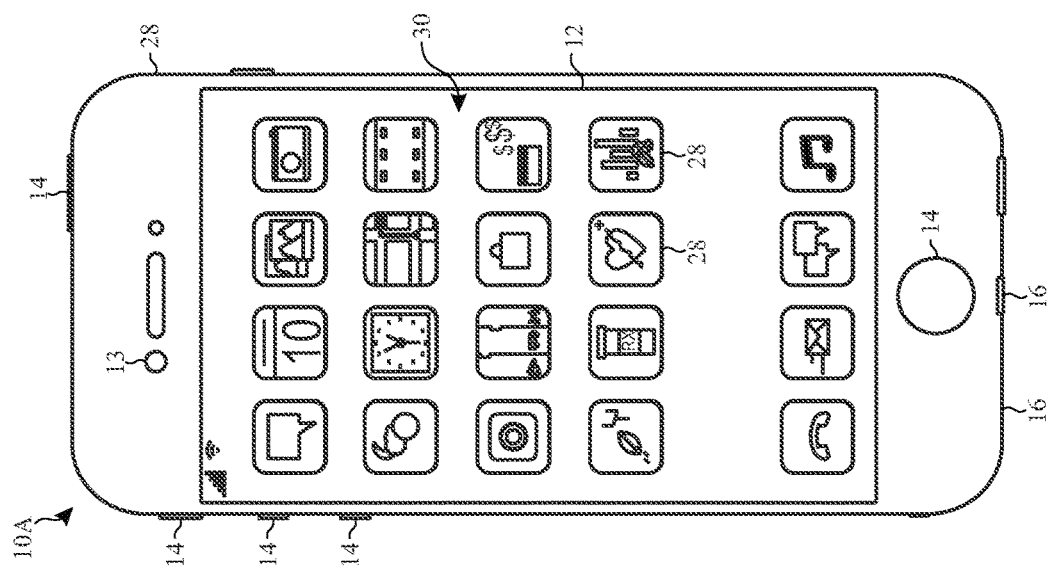
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

As depicted, the handheld device 10A includes an enclosure 28 (e.g., housing). The enclosure 28 may protect interior components from physical damage and/or shield them from electromagnetic interference. Additionally, as depicted, the enclosure 28 surrounds at least a portion of the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Furthermore, as depicted, input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. As depicted, the I/O ports 16 also extends through the enclosure 28. In some embodiments, the I/O ports 16 may include an audio jack to connect to external devices. As previously noted, the I/O ports 16 may include one or more speakers that output sounds from the handheld device 10A.

Figure 3:
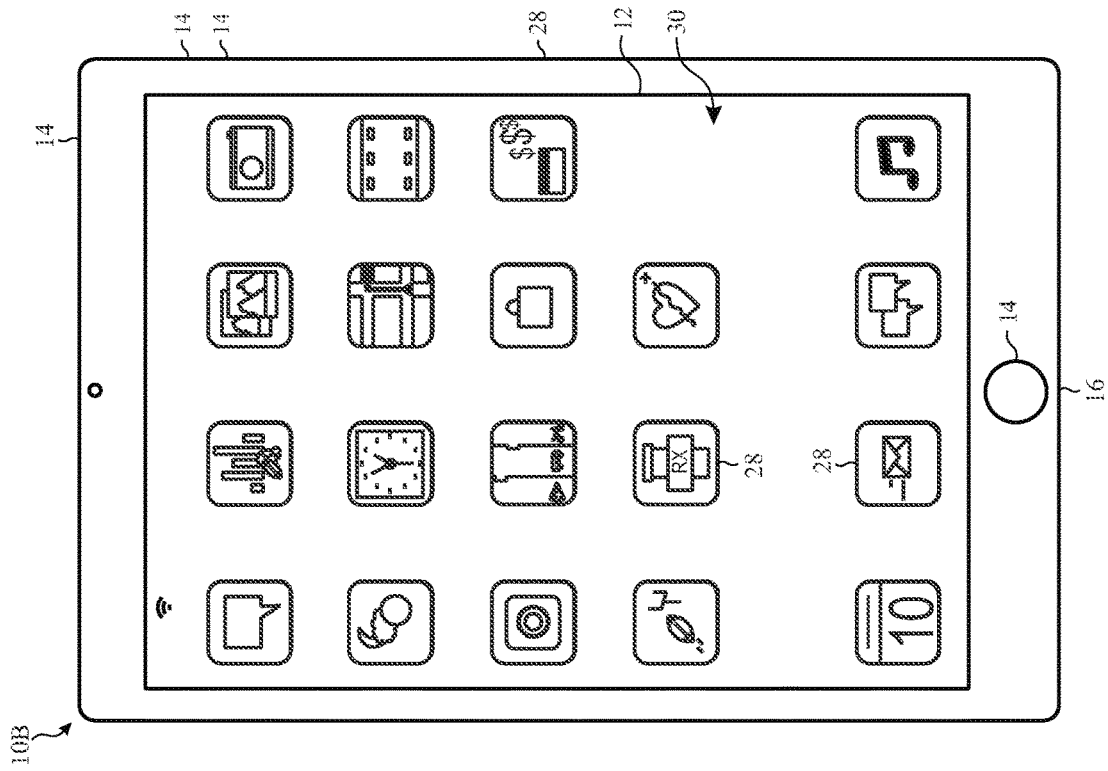
FIG. 3 is another example of the electronic device of FIG. 1, in accordance with an embodiment of the present disclosure.
Figure 4:
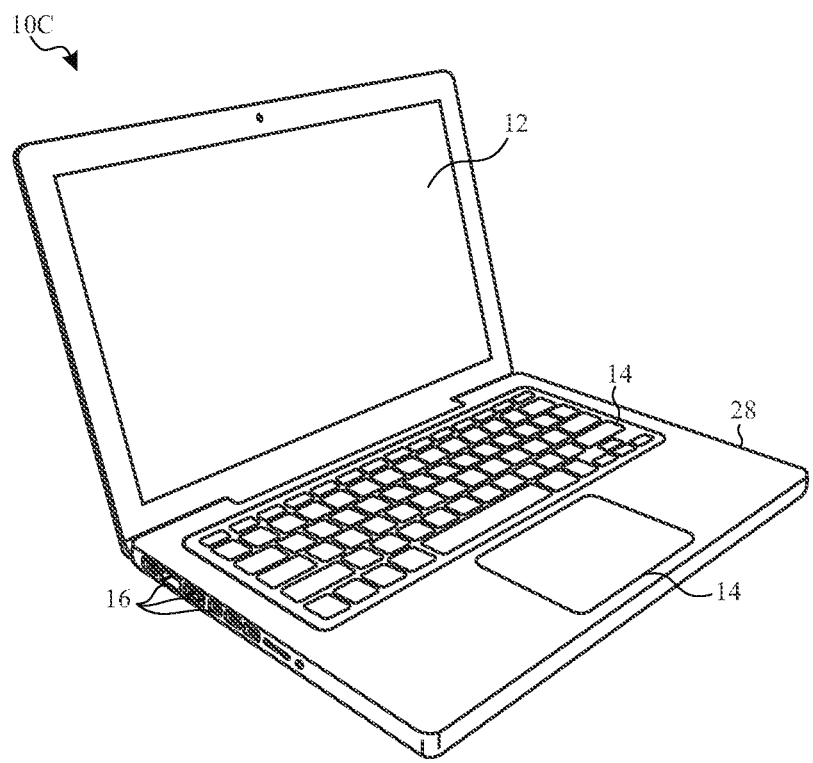
FIG. 4 is another example of the electronic device of FIG. 1, in accordance with an embodiment of the present disclosure.
Figure 5:
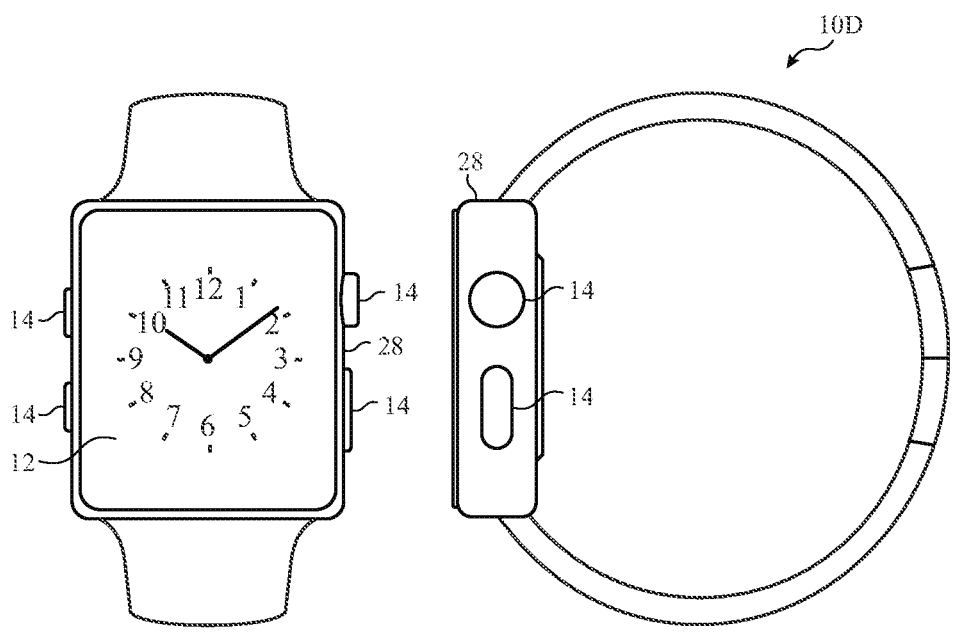
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
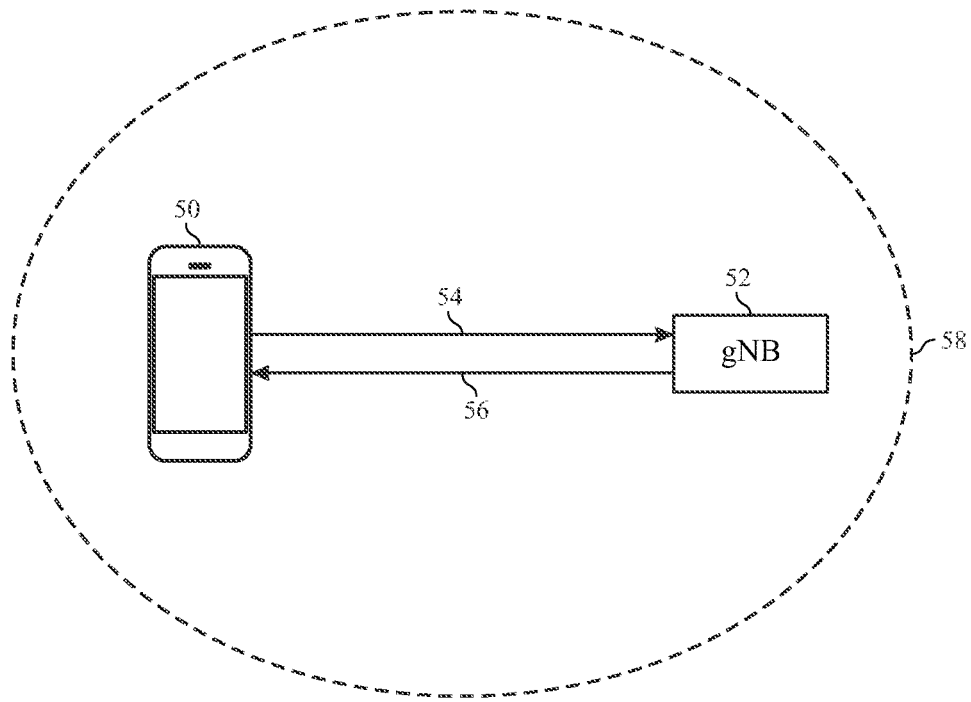
FIG. 6 is a block diagram of a wireless communication between a cellular device and a base node of a wireless network, in accordance with an embodiment of the present disclosure.

FIG. 6 is a block diagram of a user equipment electronic device (UE) 50 connected to a next generation node B (gNB) 52 via an uplink 54 and a downlink 56 inside a cell 58. The UE 50 may be embodied using the electronic device 10. Furthermore, the gNB 52 may include similar computing devices.

As previously noted, the UE 50 have periods where best beam determinations and changes may be too infrequent causing latency in the cell 58. In those periods, slots for the cell 58 may be aggregated together and signals (over PDSCH/PUSCH) may be repeated during consecutive slots to aid in identifying the best beam in a timely manner even in high mobility situations for the UE 50.

Figure 7:
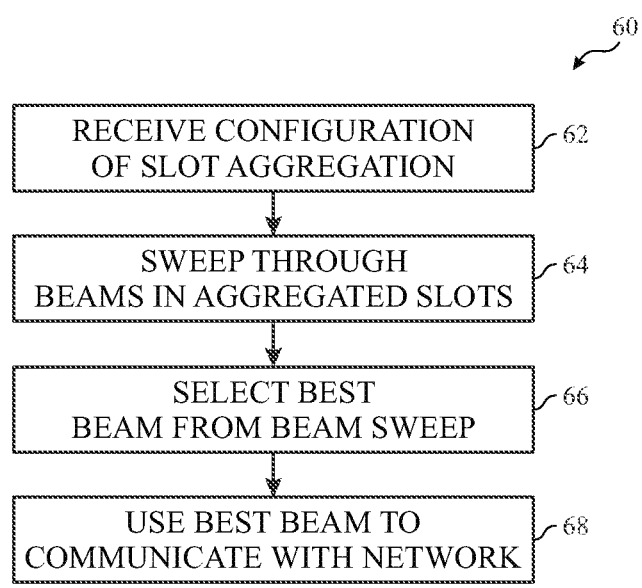
FIG. 7 is a flow diagram of a process for sweeping beams using slot aggregation, in accordance with an embodiment of the present disclosure.

FIG. 7 is a flow diagram of a process 60 that may be performed by the UE 50. The UE 50 receives a configuration of slot aggregation for communication with the gNB 52 (block 62). This received configuration may be included in a downlink control information (DCI) signal and/or other signals, such as Radio Resource Control (RRC) signaling. The received configuration may include an indication a number of slots to be aggregated, an indication of whether transmission beams and/or receiver beams are to be swept during the aggregated slots, and/or indications of additional details discussed below. During the aggregated slots, the UE 50 sweeps through beams (block 64). For example, if the UE 50 may repeat PUSCH across multiple slots using different beams to determine a best beam to be used for the uplink 54 with the gNB 52. The UE 50 receives an indication of a best beam of the beam sweep from the gNB 52 and selects that best beam (block 66). The UE 50 then uses the best beam for furthermore communication with the gNB 52 for wireless communication until a new best beam is determined (block 68).

Beam Sweep with Slot Aggregation

When downlink or uplink slot aggregation is configured, the PDSCH/PUSCH may be repeated in multiple time slots with a beam sweep. Using multiple beams from multiple panels increases the chance that beam points to the gNB 52, avoiding the increased latency in updating beams/panels or the requirement of beam alignment. Repeating PDSCH/PUSCH in slot aggregation may be analogous to transmit diversity with no or partial channel information in MIMO techniques.

Figure 8:
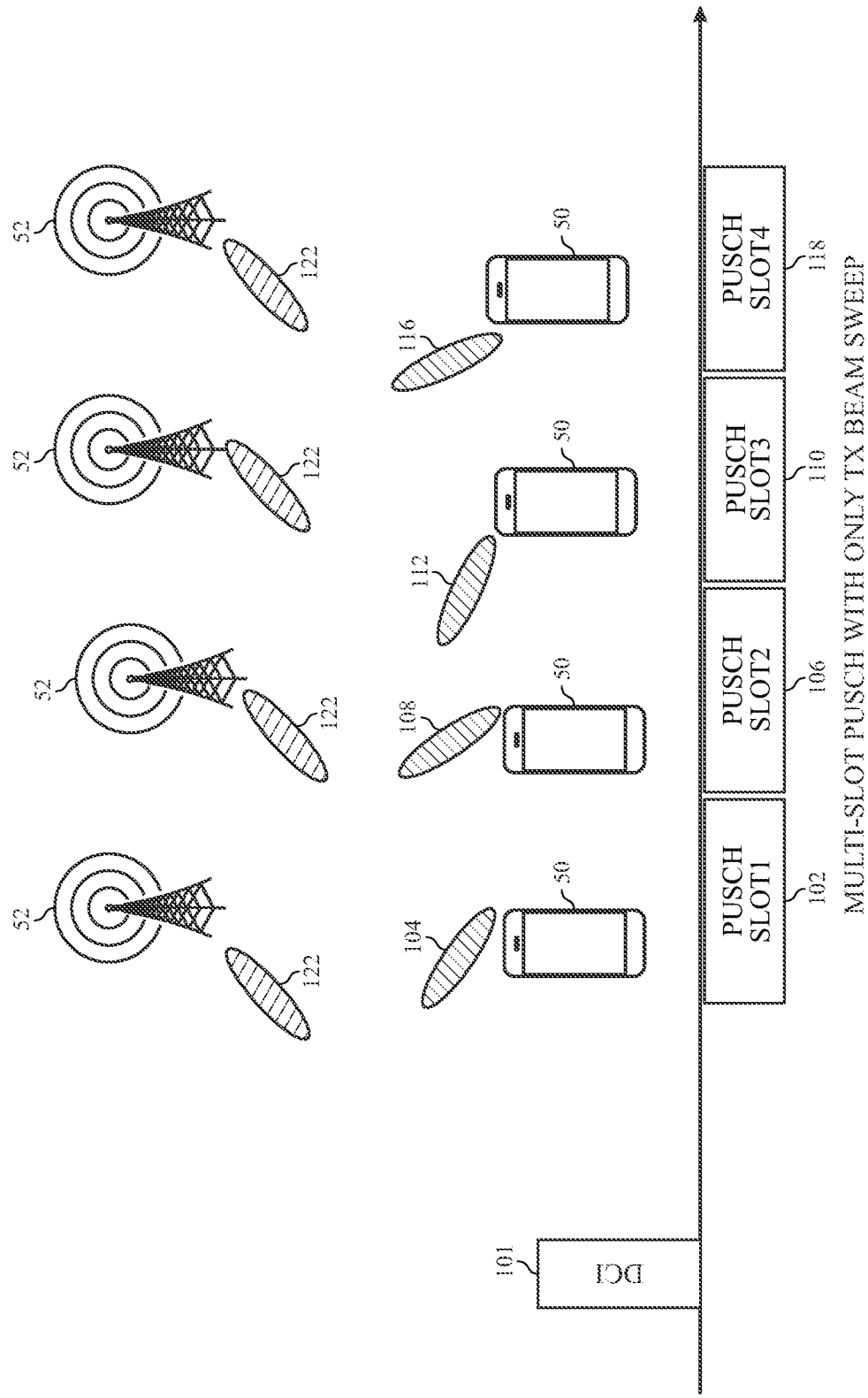
FIG. 8 is a diagram of a transmission beam sweeping, in accordance with an embodiment of the present disclosure.

As previously noted, beam sweeping may refer to sweeping transmission beams, sweeping receiving beams, or a combination of sweeping both transmission and receiving beams. As illustrated in FIG. 8, when a PUSCH is repeated in multiple slots, a UE 50 may sweep through transmission beams when only the transmission beam sweep of the UE 50 is scheduled. For instance, in a first PUSCH slot 102, the UE 50 uses a first transmission beam 104. In a second PUSCH slot 106, the UE 50 uses a second transmission beam 108. In a third PUSCH slot 110, the UE 50 uses a third transmission beam 112. In a fourth PUSCH slot 114, the UE 50 uses a fourth transmission beam 116. Since only the transmission beams are swept through the transmission beams 104, 108, 112, and 116, a gNB 52 may utilize a single receiving beam 122 for each PUSCH slot. When a PDSCH is repeated in multiple slots, the UE 50 may sweep through its beams when only the transmission beam sweep is scheduled. Regardless of whether PDSCH or PUSCH beam sweeping is applied, beam sweeping may be configured and scheduled as discussed herein.

Further, although the illustrated embodiment shows only the beams of the UE 50 being swept across the slots while a same beam (e.g., beam 122) of the gNB 52 is used, the gNB 52 may sweep through beams while the UE 50 uses a same beam in the slots 102, 106, 110, and 114.

Figure 9:
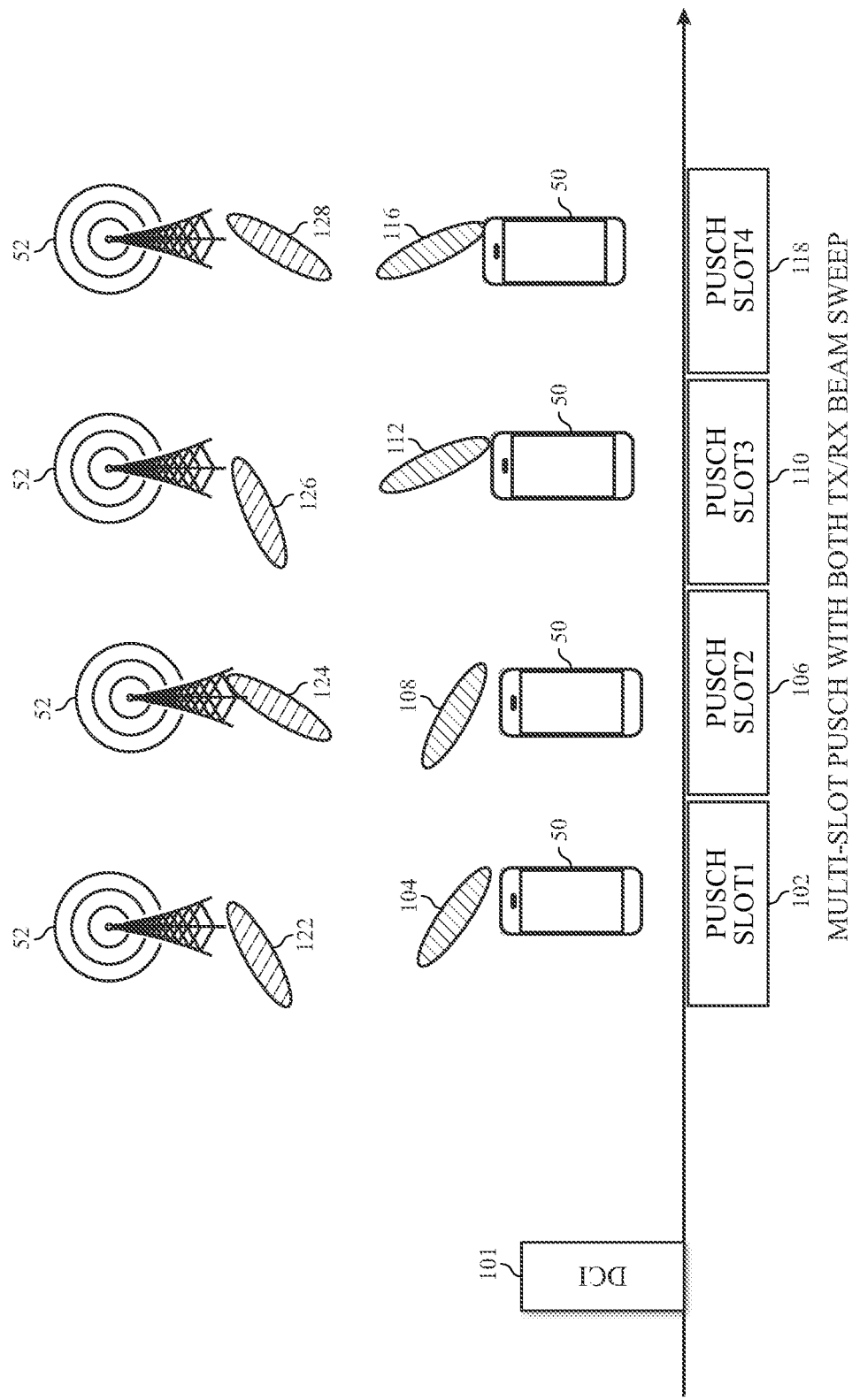
FIG. 9 is a diagram of transmission and receiving beam sweeping, in accordance with an embodiment of the present disclosure.

FIG. 9 illustrates an embodiment of a beam sweep of both transmission and receiving beams. For instance, in the first PUSCH slot 102, the UE 50 uses a first transmission beam 104 while the gNB 52 uses the first receiving beam 122. In a second PUSCH slot 106, the UE 50 uses a second transmission beam 108 while the gNB 52 uses a second receiving beam 124. In a third PUSCH slot 110, the UE 50 uses a third transmission beam 112 while the gNB 52 uses a third receiving beam 126. In a fourth PUSCH slot 114, the UE 50 uses a fourth transmission beam 116 while the gNB 52 uses a fourth receiving beam 128.

Taking PUSCH with a transmission beam sweep as an example, broadcasting the PUSCH in each slot may use a beam from a different antenna panel and/or using a beam in a different direction from the same panel to mitigate beam tracking latency for communications between the UE 50 and the gNB 52. For both transmission beam and receiving beam sweeps, the gNB 52 and the UE 50 may sweep as a pair in either order such that the gNB 52 may sweep its beam in response to the UE transmission beam sweep or the gNB 52 may be sweep its transmission beam in response to the UE beam sweep.

Configuring Downlink Slot Aggregation with Beam Sweep

Repeating PDSCH in multiple slots with a receiving beam sweep can be configured by the network through Radio Resource Control (RRC) signaling. For instance, a new RRC information element (IE) may be added to enable and/or disable beam sweeping when downlink aggregation is configured. When the new IE is set to TRUE, PDSCH is transmitted by the same transmission beam and the UE 50 can sweep receiving beams over the slots. When the new IE is set to FALSE, PDSCH is transmitted by the different transmission beams and the UE 50 uses the corresponding receiving beams over the slots.

Additionally or alternatively, a new RRC IE may be added to indicate a number of transmission beams over the aggregated slots. If the number of aggregated slots N is divisible by the number of transmission beams M, the UE 50 can sweep up to N/M receiving beams for each transmission beam. If N is not divisible by M, the UE 50 can sweep up to a ceiling function of (N/M) receiving beam for the first M-1 transmission beams and sweep fewer numbers of receiving beams for the last transmission beam. In other words, the UE 50 may sweep all receiving beams until the last transmission beam is swept. During the last transmission beam, less than all of the receiver beams are swept. Alternatively the UE 50 can sweep up to a floor function of (N/M) receiving beam for the first M-1 transmission beams and sweep more numbers of receiving beams for the last (one or more) transmission beams. In other words, the UE 50 may sweep less than all receiving beams for some of the transmission beams (e.g., all but last transmission beam) while sweeping all receiving beams for at least some of the beams (e.g., the last transmission beam).

Additionally or alternatively, a new RRC IE may be added to indicate a bitmap of the transmission beam repetition. A new RRC IE may also be used to configure one or more transmission beam patterns and define a Media Access Control Element (MAC CE) to activate and deactivate the transmission beam patterns. The transmission beam pattern for multi-slot PDSCH is a new RRC IE that defines the transmission/receiving beam sweep pattern on each slot. Multiple transmission beam patterns for multi-slot PDSCH can be configured, and one or more pattern may be added, modified or released. When the new IE is not configured, PDSCH may or may not be transmitted by different transmission beams, but the UE 50 is expected to use the same receiving beams over different slots.

Transmission Configuration Indicator (TCI) States for Downlink Slot Aggregation with Beam Sweep A TCI may be configured for a single spatial quasi-colocation (QCL) (i.e., a beam). For a transmission beam sweep and/or a receiving beam sweep, multiple transmission beams and hence multiple spatial quasi-colocation (QCL) may be configured. For instance, a new TCI-State-PDSCH-Aggregation RRC IE may be defined to contain multiple TCI-State elements. The order of the TCI-State elements corresponds to the order of the transmission beams applied over the aggregated slots. Alternatively, an extended TCI-State may be defined to contain multiple spatial QCL-Info elements. The order of spatial QCL-Info elements corresponds to the order of transmission beams applied over the aggregated slots. Hereafter both the new TCI-State-PDSCH-Aggregation IE and the extended TCI-State IE are referred as the "new" TCI-State. A single new TCI-State may be contained in the transmission beam pattern and/or multiple new TCI states may also be configured in other RRC signaling and activated/deactivated by MAC CE.

Schedule Multi-Slot PDSCH with Beam Sweep

After a transmission beam sweeping pattern and/or a receiving beam sweeping pattern is defined by RRC signaling (and activated by the MAC CE), a modified TCI field in downlink DCI signals the transmission beam. For example, up to M TCI fields may be defined in the DCI, where M is the number of transmission beams used over the N aggregated slots as configured by higher layer signaling. Additionally or alternatively, when the new TCI-State elements are defined, the TCI-State elements may indicate one of the activated new TCI-state corresponding to multiple transmission beams over aggregated slots.

After receiving the DCI, the UE 50 sweeps the receiving beams if configured to do so. A time offset (e.g., Threshold-Sched-Offset) may be applied to determining when transmission beam sweeping and/or receiving beam sweeping may be applied. This time offset provides time to prepare an antenna and/or panel hardware.

In some embodiments, no additional time offset beyond the default Threshold-Sched-Offset is used. The Threshold-Sched-Offset is applied by the TCI in normal DCCH/PDSCH time offset even when multi-slot PDSCH is configured. However, the UE 50 may foresee that receiving beam sweep may be configured (e.g., UE 50 may request sweep). In response, the UE 50 may set the panel/antenna(s) to the appropriate power state such that the panel/antenna(s) may be in active mode with no further time offset used.

Alternatively, in some embodiments, an additional time offset may be used beyond the default Threshold-Sched-Offset. In such embodiments, a new time offset threshold (i.e., Threshold-Sched-Offset-Beam-Sweep) may be used that is larger than the Threshold-Sched-Offset. The threshold levels may be used to imply transmission beam sweeping and/or receiving beam sweeping. For instance, in some embodiments, if the time offset between the DCI and the scheduled multi-slot PDSCH with both transmission beam sweep and/or receiving beam sweep is greater than Threshold-Sched-Offset-Beam-Sweep, the UE 50 may assume the transmission beam sweep is indicated by DCI in addition to the receiving beam sweep. If the time offset between DCI and the scheduled multi-slot PDSCH with both transmission/receiving sweep is shorter than Threshold-Sched-Offset-Beam-Sweep but not shorter than Threshold-Sched-Offset, the UE 50 may only sweep the receiving beams.

Configure Uplink Slot Aggregation with Beam Sweep

Repeating the PUSCH in multiple slots with a transmission beam sweep can be configured by network through RRC signaling. For instance, a new RRC IE may be added to enable and/or disable beam sweep when downlink aggregation is configured. When the new IE is set to FALSE, PUSCH is transmitted by different transmission beams so the UE 50 may sweep the corresponding transmission beams over the aggregated slots. When the new IE is set to TRUE, PUSCH is transmitted by the same transmission beam.

Additionally or alternatively, a new RRC IE may be added to indicate a number of transmission beams over the aggregated slots. If the number of aggregated slots N is divisible by the number of transmission beams M, the UE 50 can transmit PUSCH up to N/M slots for each transmission beam. If N is not divisible by M, the UE 50 can transmit PUSCH a number of slots for the first M-1 transmission beams, where the number is found using a ceiling function of (N/M). For the last transmission beam, the UE 50 may transmit PUSCH in fewer slots. Alternatively, when N cannot be divided by M, the UE 50 can transmit PUSCH a number of slots for the first M-1 transmission beams, where the number is found using a floor function of (N/M). For the last transmission beam, the UE 50 may transmit PUSCH in more slots.

Additionally or alternatively, a new RRC IE may be added to indicate a bitmap of the transmission beam repetition. A new RRC IE may also be used to configure at least one transmission beam pattern and define the MAC CE to activate and deactivate the transmission beam patterns. The transmission beam pattern for multi-slot PUSCH is a new RRC IE that defines the transmission/receiving beam sweep pattern on each slot. Multiple transmission beam patterns for multi-slot PUSCH can be configured, and one or more pattern may be added, modified, or released. When the new IE is not configured, PUSCH may or may not be transmitted by the same transmission beams but the gNB 52 may not use different receiving beams over slots.

Sounding Reference Signal Resource Indicator (SRI) for Uplink Slot Aggregation with Beam Sweep An SRI may typically indicate a single Sounding Reference Signal (SRS) resource (and a corresponding transmission beam). Each SRS resource contains a resource allocation for the SRS transmission. In some embodiments, the SRI may optionally contain a spatial relation to a Reference Signal (RS). For a transmission beam sweep and/or a receiving beam sweep, multiple transmission beams and hence multiple SRS resources may be indicated in a single SRI. For instance, a new SRS-Resource-Aggregation RRC IE may be defined to contain multiple SRS resources. The order of SRS resources corresponds to the order of transmission beams applied over the aggregated slots. Alternatively, an extended SRS resource may be defined to contain multiple resource allocations (and optionally multiple spatial relations). The order of resource allocations corresponds to the order of transmission beams applied over the aggregated slots. Hereafter, both the new SRS-Resource-Aggregation IE and the extended SRS resource IE are referred as the "new" SRS resource. The new SRS resource may be contained in the transmission beam pattern, and/or multiple new SRS resources can also be configured in other RRC signaling and activated/deactivated by MAC CE.

Schedule Multi-Slot PUSCH with Beam Sweep.

After a transmission beam sweeping pattern and/or a receiving beam sweeping pattern is defined by RRC signaling (and activated by the MAC CE), a modified SRI field in uplink DCI signals the transmission beam. For example, up to M SRI fields may be defined, where M is the number of transmission beams used over the N aggregated slots as configured by higher layer signaling. Additionally or alternatively, when the new SRS resource IEs are defined, the SRI field indicates one of the activated new SRS resources corresponding to multiple transmission beams over aggregated slots.

In response to receiving a DCI, the UE 50 sweeps the transmission beams, if configured to do so. A time offset (e.g., preparation time) may be applied to determining whether transmission beam sweeping and/or receiving beam sweeping may be applied. This time offset provides time to prepare an antenna and/or panel hardware.

Similar to the PDSCH, no additional time offset beyond the Threshold-Sched-Offset may be used in some embodiments. Thus, the Threshold-Sched-Offset is applied by the TCI in normal DCCH/PDSCH time offset. In such embodiments, when multi-slot PUSCH is configured, the UE 50 may foresee that the transmission beam sweep would be configured. In response, the UE 50 may set the panel/antenna(s) to the appropriate power state such that the panel/antenna(s) may be in active mode with no further time offset used.

Alternatively, in some embodiments, an additional time offset may be used beyond the Threshold-Sched-Offset used for normal PUSCH preparation procedure time. In such embodiments, a new time offset threshold (i.e., Threshold-Sched-Offset-Beam-Sweep) may be used that is larger than the Threshold-Sched-Offset. The threshold levels may be used to imply transmission beam sweeping and/or receiving beam sweeping. For instance, in some embodiments, if the time offset between the DCI and the scheduled multi-slot PUSCH with both transmission beam sweep and/or receiving beam sweep is greater than Threshold-Sched-Offset-Beam-Sweep, the UE 50 may apply the transmission beam sweep as indicated by DCI. Otherwise, the UE 50 may either discard the DCI, or only transmit the PUSCH in the slots with the first indicated transmission beam.

Event-Triggered Slot Aggregation with Beam Sweep Request

Figure 10:
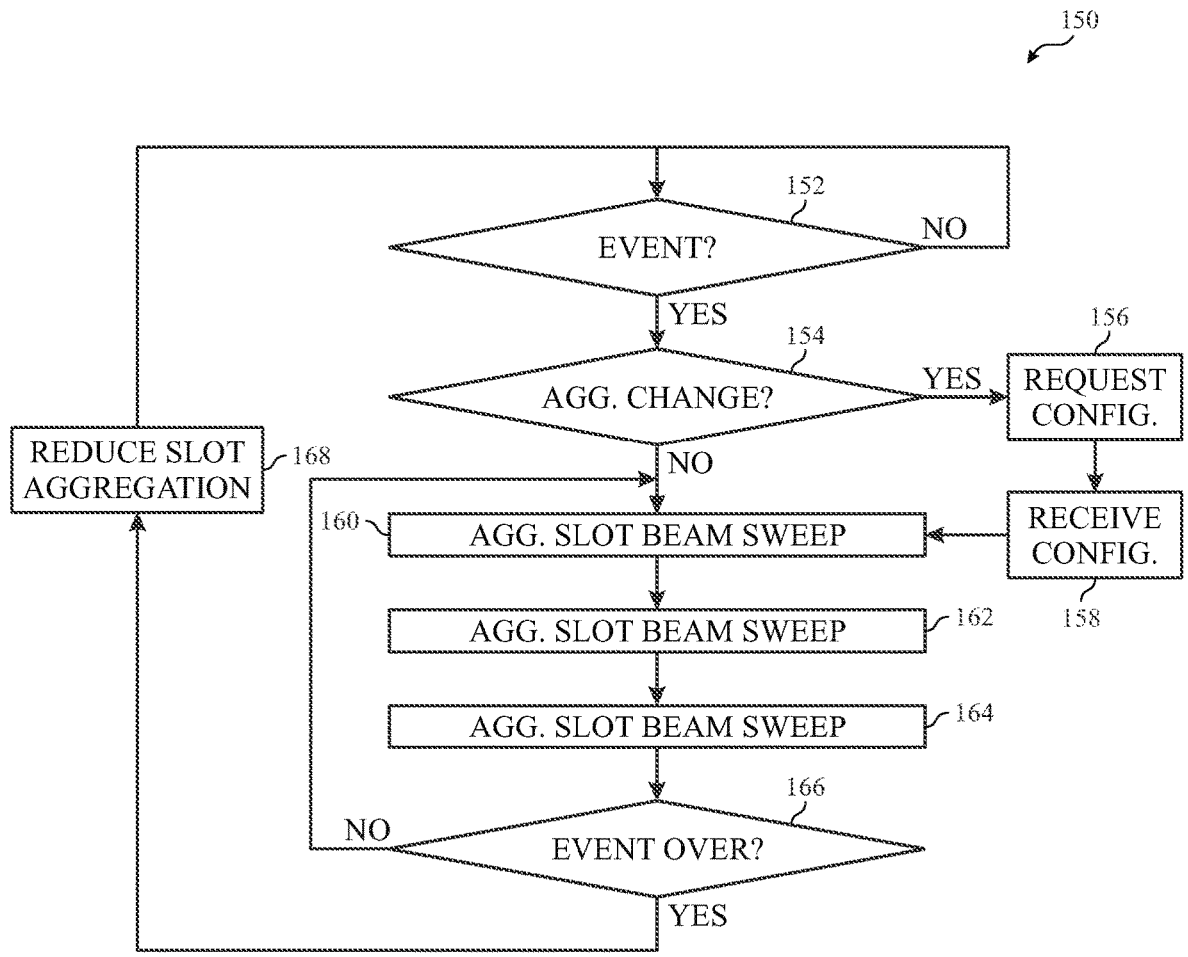
FIG. 10 is a flow diagram of an event-driven beam sweep using slot aggregation, in accordance with an embodiment of the present disclosure.

Slot aggregation may occur in response to events detected at the UE 50. FIG. 10 illustrates a process 150 that may be used to change aggregation based on events. The UE 50 determines whether an event has occurred (block 152). These events may be defined in the specifications. For instance, the event may include a rate of beam change for communication with/from the UE 50 above a threshold, quality-of-service (QoS) having a delta above a QoS threshold and occurring more frequent than a frequency threshold, and/or other events. The UE 50 (and/or the network) determines whether this event is to have a corresponding change in slot aggregation (block 154). For instance, the UE 50 may determine whether a crossed threshold corresponds to a higher level of slot aggregation than is currently being used (e.g., no slot aggregation) in communications using the UE 50. In some embodiments, multiple thresholds may be used for each event type and regions between thresholds may be associated with a corresponding slot aggregation in a look-up table in the network and/or the UE 50.

When an event occurs and aggregation is to be changed, the UE 50 sends an event-triggered request to the network via the gNB 52 (block 156). If slot aggregation (either downlink or uplink or both) is not configured, the UE 50 requests to configure slot aggregation including any of the foregoing configuration techniques. The UE 50 then requests to configure beam sweep over the aggregated slots. Additionally, in some embodiments, the UE 50 may request (e.g., in the request) a number for the aggregated slots, a number of receiving beams to sweep for downlink slot aggregation, and/or a number of transmission beams to sweep for uplink slot aggregation. Furthermore, the UE 50 may also send an expected duration for such a request thereby setting an expiration for the slot aggregation absent a subsequent request.

In response to the request, the UE 50 receives configuration of the slot aggregation and/or beam sweep (e.g., slot allocations and time offsets) to be used (block 158). Using the newly sent configuration or previously set configuration, the UE 50 and the gNB 52 perform beam sweeping using the aggregated slots (block 160). During the sweep, the UE 50 and/or the network selects a best beam combination for communication between the UE 50 and the gNB 52 (block 162). The UE 50 and the gNB 52 then uses corresponding beams for communications (block 164).

Since slot aggregation uses network and/or UE 50, the UE 50 may monitor for when the event has ended to determine when to free up resources (block 166). When the criteria of such an event is no longer met, the UE 50 can send a new event-triggered report to withdraw the previous request and to reduce slot aggregation (block 168). Reducing slot aggregation may include disabling slot aggregation. Additionally or alternatively, the network may use the expected duration in the request or may independently determine when to stop slot aggregation based on a duration of the slot aggregation versus the expected duration or the independent determination.

Related UE Capabilities

Capabilities of the UE 50 may be defined corresponding to each or some of the UE 50 features previously described and/or may be sent to the network to indicate capabilities of the UE 50. For example, the UE 50 capabilities may include an indication of whether the UE 50 supports transmission beam sweeping in uplink slot aggregation, an indication of a number of transmission beams the UE 50 can sweep in uplink slot aggregation, an indication of a number of transmission beam patterns in uplink slot aggregation, an indication of a PUSCH preparation procedure time for uplink slot aggregation of the UE 50, an indication of whether the UE 50 supports receiving beam sweeping in downlink slot aggregation, an indication of a number of receiving beams the UE 50 can sweep in downlink slot aggregation, an indication of a number of receiving beam patterns in downlink slot aggregation, an indication of a threshold of time offset between the DCI and the scheduled multi-slot PDSCH with beam sweeping for the UE 50, and/or other indications related to capabilities to perform the operations discussed herein.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   indicating, using a first radio resource control (RRC) information element (IE), to use link aggregation;
   indicating, using a second RRC IE, a number of beams to use over aggregated slots during the link aggregation;
   indicating, using a third RRC IE, a bitmap of repetition of the beams;
   configuring, using a fourth RRC IE, a beam pattern; and
   communicating using the beam pattern.

2. The method of claim 1, wherein the link aggregation comprises uplink aggregation.

3. The method of claim 1, wherein the link aggregation comprises downlink aggregation.

4. The method of claim 1, wherein the beams comprise beams of a user equipment (UE) device.

5. The method of claim 1, wherein a physical uplink shared channel (PUSCH) is transmitted over one or more beams when the first RRC IE indicates that the link aggregation is used.

6. The method of claim 1, wherein a physical downlink shared channel (PDSCH) is transmitted over one or more beams when the first RRC IE indicates that the link aggregation is used.

7. The method of claim 6, wherein the one or more beams are received at one or more panels of a user equipment (UE) device.

8. A method, comprising:
   defining a number of transmission configuration indicator (TCI) fields in downlink control information (DCI) indicating a number of beams to be used over a number of aggregated slots indicated using radio resource control (RRC) signaling;
   indicating, using an RRC information element (IE), a bitmap of repetition of the beams;
   configuring, using a second RRC IE, a beam pattern; and
   using the DCI, communicating using the beam pattern over the aggregated slots.

9. The method of claim 8, wherein at least one of the TCI fields indicates a TCI state corresponding to two or more beams over the aggregated slots.

10. The method of claim 8, wherein the number of TCI fields is the same as the number of beams used over the aggregated slots.

11. The method of claim 8, comprising using a defined physical downlink shared channel (PDSCH) preparation procedure time after the DCI before utilizing a multi-slot PDSCH.

12. The method of claim 8, comprising configuring, using a media access control element (MAC CE), enabling or disabling of the beam pattern.

13. The method of claim 8, wherein the beam pattern defines a receiving beam to be used in each of the aggregated slots.

14. An electronic device, comprising:
   one or more antenna arrays configured to transmit wireless communication signals to a node of a wireless network;
   a processor; and
   memory storing instructions, that when executed by the processor, are configured to cause the processor to:
   indicate, using a first radio resource control (RRC) information element (IE), to use link aggregation;
   indicate, using a second RRC IE, a number of beams to use over aggregated slots during the link aggregation;
   indicate, using a third RRC IE, a bitmap of repetition of the beams;
   configure, using a fourth RRC IE, a beam pattern; and
   communicate using the beam pattern via the one or more antenna arrays.

15. The electronic device of 23, wherein the link aggregation comprises downlink aggregation.

16. The electronic device of claim 14, the beam pattern defining a receiving beam to be used in each of the aggregated slots.

17. The electronic device of claim 14, the instructions further configured to cause the processor to indicate that beam sweeping is to be disabled when using the beams.

18. The electronic device of claim 14, the communicating using the beam pattern comprising receiving a physical downlink shared channel (PDSCH) over the beams.

19. The electronic device of claim 18, the beams comprising receiving beams of the electronic device.

20. The electronic device of claim 19, the beams comprising a spatial quasi-colocation (QCL).

* * * * *